Patented Aug. 10, 1954

2,686,126

UNITED STATES PATENT OFFICE 2,686,126

TREATMENT OF FISH

John Arnold Lovern and Sidney William Firth Hanson, Aberdeen, and Hugh Hanchard Goodwin and Thomas Hamilton Wilson, Edinburgh, Scotland No Drawing. Application June 9, 1949, Serial No. 99,852

11 Claims. (Cl. 99—111)

The present invention is concerned with the treatment of oily fish and the offal of oily fish such as herrings, mackerel and pilchards. Such fish and offal are hereinafter referred to as oily fish material or simply as material.

An object of the invention is to treat the material to prevent putrefaction and to allow it to be stored without offence.

Another object is to treat the material to recover separately oil and protein therefrom.

Other objects of the invention will become apparent as the description proceeds.

According to the present invention we prevent putrefaction and store the material by digesting the material in cold aqueous alkali. We find that this is a satisfactory method of preservation for periods at least of months and thus enables a factory to deal economically with gluts and seasonal variations in catches.

Cold digestion of the material slowly takes the protein into solution and releases the oil while depositing the bones as sludge, but the separation is not so far going as the known oil recovery processes in which the material is digested with hot aqueous alkali which very rapidly dissolves the protein, and in which after settling a superficial layer of oil and oil emulsion is formed which can be removed and clarified or otherwise treated. The cold digestion for storage in accordance with the present invention constitutes a substantial preliminary stage however. Simply by heating the ingredients at any stage, dissolution of the protein and separation of the oil or oil emulsion are completed to the degree obtained in the known process of hot digestion. Further a substantial proportion of protein is recovered from the aqueous layer by acidifying it to about pH 4.2, when a partially hydrolised product is precipitated; the odour and taste may be reduced by washing with water, which may be followed by further washing with an organic solvent for oil, which will not denature the protein, a suitable solvent being acetone.

The liquor remaining after acid precipitation as just described may be neutralised with alkali and evaporated to a pasty product which though edible is not very palatable and can be used in cattle food. Alternatively the said liquor may be neutralised and evaporated down to a volume not less than a quarter and treated with a relatively large bulk of an organic solvent which will remove the salt, a suitable solvent being acetone; this results in a similar substance being precipitated in an aqueous underlying layer, but it differs from that obtained by the above mentioned direct evaporation in that it contains less alkai and ammonium salts and is therefore more palatable. As will be understood from the description hereinafter, with the preferred reagents the salts will be sodium chloride and ammonium chloride. This precipitated aqueous layer may be evaporated to yield a paste, and to ensure elimination of any flavour of acetone, the layer may be diluted with water before the evaporation.

As examples of alkali which may be used for the digestion and the subsequent neutralisation after the acid precipitation, caustic soda, sodium carbonate and caustic potash (used in chemically equivalent quantities) may be mentioned. So far as the precipitation is concerned almost any acid, e. g. hydrochloric, sulphuric, phosphoric or acetic acid, may be used. We prefer however to use a sodium alkali and hydrochloric acid because the pasty product is intended for human consumption and these reagents finish as common salt.

The evaporations referred to can be carried out under atmospheric pressure but we prefer to effect them under reduced pressure in order to avoid long-time high temperature treatment which may produce a scorched flavour in the product. The solutions have a tendency to froth however and this limits the vacuum which can be used.

As further illustrating the invention an example of its application to herrings will be described in greater detail.

In applying the process to oily fish material from species other than herring, the same quantities may be used, because they are based on total protein content which is always about 16 per cent of the total.

Whole herrings, minced or macerated herrings or herring offal are mixed with an equal weight of cold water and 3% of their weight of caustic soda. The effect of the admixture of the caustic soda solution is to retard the onset of putrefaction and to induce digestion of the herring, which commences at once. In the cold the digestion is slow but ultimately the protein is taken into aqueous solution and the oil in the fish or offal is released. The process can be speeded up at any time by heating the mixture to about 90° C. with gentle stirring until the protein is more or less completely peptised and taken into aqueous solution. The length of the digestion period depends on whether or not the mixture is heated, and, should it be heated, on the rate of heating; at 90° C. digestion of minced or macerated herrings requires less than 10 minutes or whole herrings 40 minutes. After hot digestion, the mixture is allowed to settle while remaining hot. After cold digestion, the mixture still requires to be heated to allow the oil to separate completely into a superficial layer.

The superficial oil layer, including any oil emulsion, is then removed and may be further clarified either in settling tanks or by centrifuges. The aqueous layer is removed and worked up for protein recovery as described below. At the bottom of the digestion vessel is a sludge of calcium phosphate derived from bones, and this may be readily removed and washed with water, after which it may be dried to a nearly white product.

The aqueous liquor remaining after oil removal is dark reddish-brown in colour, usually quite clear, smells strongly of ammonia, and will keep more or less indefinitely. On storing in cold weather it partly sets to a weak gel. We have found that protein cannot be recovered from the solution by mere boiling because although this expels a considerable part of the ammonia, further hydrolysis which is undesirable appears to go on slowly, more and more ammonia being produced, and it is never possible to get an ammonia-free liquor. Moreover, boiling out of ammonia does not appreciably reduce the amount of acidity needed to acidify the liquor. On acidification with hydrochloric acid to about pH 4.2, a partially-hydrolised product equivalent to 40–50 per cent of the original total protein of the herring is precipitated. This product, in its crude state, has a strong odour and taste but by washing it five times, each time with a volume of water equal to that of the original liquor, these qualities are almost entirely removed. The pH of the product remains at about 4.2 during water washing. In laboratory experiments the precipitate has been recovered after each washing by means of a centrifuge. After the final washing the precipitate may be suspended in acetone (½ volume of original liquor) which both dries it and extracts some of the small amount of contaminating oil. The product is then washed with a total of another ½ volume of acetone and finally freed from acetone by drying in air. The acetone fractions may be distilled to recover the solvent. The washed product is very light grey in colour, and practically odourless and tasteless. It is finely milled and may be used as an egg alubumen substitute. Thus it has good foaming properties of value in making confectionery, baking and the like operations. It should be used soon after preparation as it may develop a fishy flavour after storage.

The liquor remaining from the first acid precipitation can be neutralised with alkali (about four gms. caustic soda per litre of liquid) and evaporated to a pasty product with the odour and appearance of meat extract. The flavour, however, is too salty to be palatable and there is an unpleasantly bitter after taste due to the presence of ammonium chloride, but this product may be used for adding to compounded animal feeding stuffs.

If the liquor remaining from the first acid precipitation is neutralised and evaporated to one quarter of its volume, and then two volumes of acetone gradually added with thorough stirring, most of the meat-extract like substances are precipitated in an aqueous underlying layer. The top layer, making up some ⅘ of the total volume, consists of aqueous acetone, and carries with it much of the salt and ammonium chloride. Care must be taken not to carry the evaporation down to less than ¼ of the original volume as the liquor then becomes quite immiscible with acetone. On the other hand the evaporation need not be carried down to ¼ volume. In this case a larger proportion of salt is taken up into the upper layer, but there is also a greater loss of the desired product in the upper layer. Thus it is possible to obtain products with different proportions of salt, but the yield goes down with reduction of salt in the product. The upper acetone layer may be distilled for recovery of the solvent.

The precipitated aqueous layer from the above described acetone treatment may be evaporated under vacuum to a thick paste. The crude precipitate contains some acetone, which is removed along with the water. If necessary, to remove all acetone flavour, some extra water, up to one volume, is added to this fraction before it is evaporated. The final product may be used as a substitute for meat extract.

We claim:

1. The method of separately recovering oil and protein from oily fish material which comprises digesting the material in an aqueous solution of a strong alkali selected from the group consisting of the hydroxides and carbonates of sodium and the hydroxide of potassium until the protein is taken into solution, heating the ingredients at any stage and maintaining the temperature sufficiently to cause separation of a superficial layer of oil and oil emulsion, separating the aqueous layer from the oil and oil emulsion and from the sludge, acidifying the aqueous liquor to a pH of about 4.2, removing the precipitate, washing the precipitate with water, then with acetone, and then drying it to free it of acetone.

2. A method as set forth in claim 1 wherein acidifying is effected with hydrochloric acid.

3. A method as set forth in claim 1 wherein the alkali is sodium hydroxide.

4. A method as set forth in claim 1 wherein the digestion is effected in a solution containing water approximately equal in weight to the material and the equivalent of 3 per cent by weight of sodium hydroxide, and the acidifying is effected with hydrochloric acid.

5. A method as set forth in claim 1 comprising the further steps of neutralising the liquor remaining from the acid precipitation with alkali, and evaporating the neutralised liquid to a pasty product.

6. A method as set forth in claim 1 comprising the further steps of neutralising the liquor remaining from the acid precipitation with alkali, evaporating the neutralised liquid down to a volume not less than ¼, slowly admixing an excess of acetone with stirring thereby precipitating an aqueous layer, and evaporating the aqueous layer down to a thick paste.

7. A method as set forth in claim 6 wherein the aqueous layer is diluted with water before evaporation.

8. The method of recovering protein from oily fish material which comprises digesting the material in aqueous sodium hydroxide under sufficient heat to take the protein into solution and to cause separation of a superficial layer of oil and oil emulsion, separating the underlying aqueous layer from the oil and oil emulsion and from the sludge, acidifying the aqueous layer with hydrochloric acid to a pH of approximately 4.2, removing the precipitate, washing the precipitate with water, then with acetone, and then drying it to free it of acetone.

9. A method as set forth in claim 8 comprising the further steps of neutralising the liquor remaining from the acid precipitation with alkali, and evaporating the neutralised liquor to a pasty product.

10. A method as set forth in claim 8 comprising the further steps of neutralising the liquor remaining from the acid precipitation with alkali, evaporating the neutralised liquid down to a volume not less than ¼, slowly admixing an excess of acetone with stirring thereby precipitating an aqueous layer, separating the aqueous layer and evaporating it down to a thick paste.

11. A method as set forth in claim 10 wherein the aqueous layer is diluted with water before evaporation.

References Cited in the file of this patent

UNITED STATES PATENTS

| Number | Name | Date |
|---|---|---|
| 1,030,674 | Monhaupt | June 25, 1912 |
| 1,101,513 | Alder | June 23, 1914 |
| 1,138,348 | Bohon | May 4, 1915 |
| 1,472,332 | Hildebrandt | Oct. 30, 1923 |
| 1,532,521 | Thomson | Apr. 7, 1925 |
| 2,280,024 | Bedford | Apr. 14, 1942 |
| 2,303,740 | Hempel | Dec. 1, 1942 |
| 2,358,869 | Maurer et al. | Sept. 26, 1944 |
| 2,512,375 | Parfentjev | June 20, 1950 |
| 2,589,287 | Ryan et al. | Mar. 18, 1952 |

FOREIGN PATENTS

| Number | Country | Date |
|---|---|---|
| 12,686 | Great Britain | of 1900 |